United States Patent [19]

Hannon et al.

[11] Patent Number: 4,823,205

[45] Date of Patent: Apr. 18, 1989

[54] CAPACITIVE SENSOR FOR HEAD POSITIONING IN MAGNETIC RECORDING DISK FILES

[75] Inventors: David M. Hannon, Palo Alto; Donald E. Horne, San Jose, both of Calif.

[73] Assignee: International Business Machines Corporation, Armonk, N.Y.

[21] Appl. No.: 153,101

[22] Filed: Feb. 8, 1988

[51] Int. Cl.$^4$ ................. G11B 13/00; G11B 5/596
[52] U.S. Cl. ..................................... 369/14; 369/126; 360/77.03; 360/103
[58] Field of Search ................. 360/75, 77, 78, 135, 360/103, 110, 102; 369/13, 14, 43, 126

[56] References Cited

U.S. PATENT DOCUMENTS

| | | | |
|---|---|---|---|
| 4,400,807 | 8/1983 | Furuichi et al. | 369/43 |
| 4,556,597 | 12/1985 | Best et al. | 369/14 |
| 4,639,906 | 1/1987 | Goto | 369/14 |
| 4,648,087 | 3/1987 | Scranton et al. | 360/103 |

OTHER PUBLICATIONS

Klaassen, K. B., "Capacitive Servo Detector", IBM Technical Disclosure Bulletin, vol. 26, No. 6, Nov. 1983, pp. 2942-2946.
Clemens, J. K., "Capacitive Pickup and the Buried Subcarrier Encoding System for the RCA VideoDisc", RCA Review, vol. 39, Mar. 1978, pp. 33-41.

*Primary Examiner*—Alan Faber
*Assistant Examiner*—Steven R. Garland
*Attorney, Agent, or Firm*—Thomas R. Berthold

[57] ABSTRACT

A capacitive sensor for detecting capacitive contrast servo information on a disk in a data recording disk file includes a center-tapped inductor connected to a high frequency oscillator, a sensing probe formed on the back side of the slider and electrically coupled to one end of the inductor, and a dummy probe also formed on the back side of the slider and electrically connected to the other end of the inductor. The center-tapped inductor forms a primary coil of a transformer so that variations in capacitance sensed by the sensing probe provide a differential output signal in the inductor which is sensed by the transformer secondary coil. The probes, and their electrically conductive leads and terminal pads, are formed by thin film deposition techniques on the back side of the slider and are located with respect to the inductive read/write head so as to equally receive any noise generated by the read/write head. The dummy probe is spaced away from the air bearing surface of the slider so that the variation in capacitance due to the capacitive contrast pattern on the disk is received only by the sensing probe.

8 Claims, 2 Drawing Sheets

CAPACITIVE SENSOR FOR HEAD POSITIONING IN MAGNETIC RECORDING DISK FILES

TECHNICAL FIELD

This invention relates to read/write head positioning control systems in magnetic recording disk files, and in particular to a capacitive sensor for detecting capacitive contrast servo information on the disk for use in positioning the read/write head.

BACKGROUND

Magnetic recording disk files are information storage devices which utilize at least one rotatable disk with circular data tracks, a read/write head for reading and writing data to the various tracks, and a head positioning actuator connected to the head for moving it to the desired track and maintaining it over the track centerline during read or write operations. The read/write head is attached to an air bearing slider which is supported adjacent the data surface of the disk by a cushion of air generated by the rotating disk. The slider is attached to a generally flexible suspension which in turn is attached to the rigid support arm of the head positioning actuator.

In order to accurately position the read/write head radially on the disk, it is necessary to incorporate a servo control system which utilizes servo information previously magnetically recorded either on a dedicated servo disk or on sectors angularly spaced and interspersed among the data on a data disk. The servo information is sensed by the read/write head, or the dedicated servo head if a dedicated servo disk is used, and is demodulated to generate a position error signal which is an indication of the position error of the head away from the nearest track centerline. The use of magnetically recorded servo information reduces the amount of disk surface available for data, especially when an entire disk surface is required for the recorded servo information.

The loss of disk surface available for data can be prevented by a servo technique which involves sensing variations in capacitance of a predetermined capacitive contrast pattern formed on the same disk which contains the magnetically recorded data. The capacitive contrast servo pattern provides head position information for use by the servo control system. A magnetic recording disk containing a capacitive contrast pattern is described in assignee's published European patent application EP 125,478, which corresponds to assignee's co-pending application, U.S. Ser. No. 494,743, now abandoned. The structure of that disk is a conventional aluminum-magnesium substrate, a dielectric layer of epoxy phenolic resin formed on the substrate, a patterned aluminum film formed on the dielectric layer, and a conventional magnetic coating of an organic binder containing magnetic particulates formed over the patterned aluminum film. The presence or absence of aluminum in the patterned aluminum film serves as the capacitive contrast servo pattern. A different type of magnetic recording disk with a capacitive servo pattern is described in assignee's U.S. Pat. No. 4,556,597, wherein the capacitive contrast pattern comprises doped and undoped portions of the silicon disk substrate which supports the overlying magnetic coating. A capacitive sensor for use with suck disks is described in the IBM Technical Disclosure Bulletin, Vol. 26, No. 6 (Nov. 1983), pp. 2942-2946. This sensor utilized DC excitation of the capacitance to be measured. A capacitive sensor which utilizes an inductive element formed via thin film technology on the back side of the slider is described in assignee's U.S. Pat. No. 4,648,087. The variations in capacitance sensed by the sensor described in the '087 patent result in a change in the resonant frequency of the sensor circuit.

SUMMARY OF THE INVENTION

The present invention is an improved capacitive sensor for head positioning magnetic recording disk files and comprises a center-tapped inductor connected to a high-frequency oscillator, a sensing probe formed on the back side of the slider and electrically coupled to one end of the inductor, and a dummuy probe also formed on the back side of the slider and electrically connected to the other end of the inductor. The end of the sensing probe is preferably located near the air bearing surface of the slider so as to face the capacitive contrast pattern on the disk surface, while the dummy probe is located away from the air bearing surface. The inductor forms the primary coil of a transformer so that variations in capacitance sensed by the sensing probe provide an output signal in the inductor which is sensed by the transformer secondary coil. The pattern of capacitive contrast servo information formed on the disk include stripes of conductive material slanted relative to the circular data tracks. The phase of the output signal provided by the slanted stripes, as measured relative to a reference signal, provides an indication of the radial position of the head.

The surface areas of the sensing probe and dummy probe and their respective electrical leads and terminal pads formed on the slider are generally equal so that the capacitance between the probes and the slider is generally equal, thereby preventing any output signal in the inductor. In addition, the sensing probe and dummy probe and their respective leads are oriented relative to the inductive read/write head on the slider so that any noise generated from the inductive head is received by both the sensing probe and dummy probe. The sensing probe is formed by thin film techniques to a predetermined thickness on the slider such that its end facing the disk surface has a surface area which generally matches the width of the stripes in the capacitive contrast pattern.

For a fuller understanding of the nature and advantages of the present invention reference should be made to the following detailed description taken on conjunction with the accompanying drawings.

DESCRIPTION OF THE PREFERRED EMBODIMENTS

Figure 1:
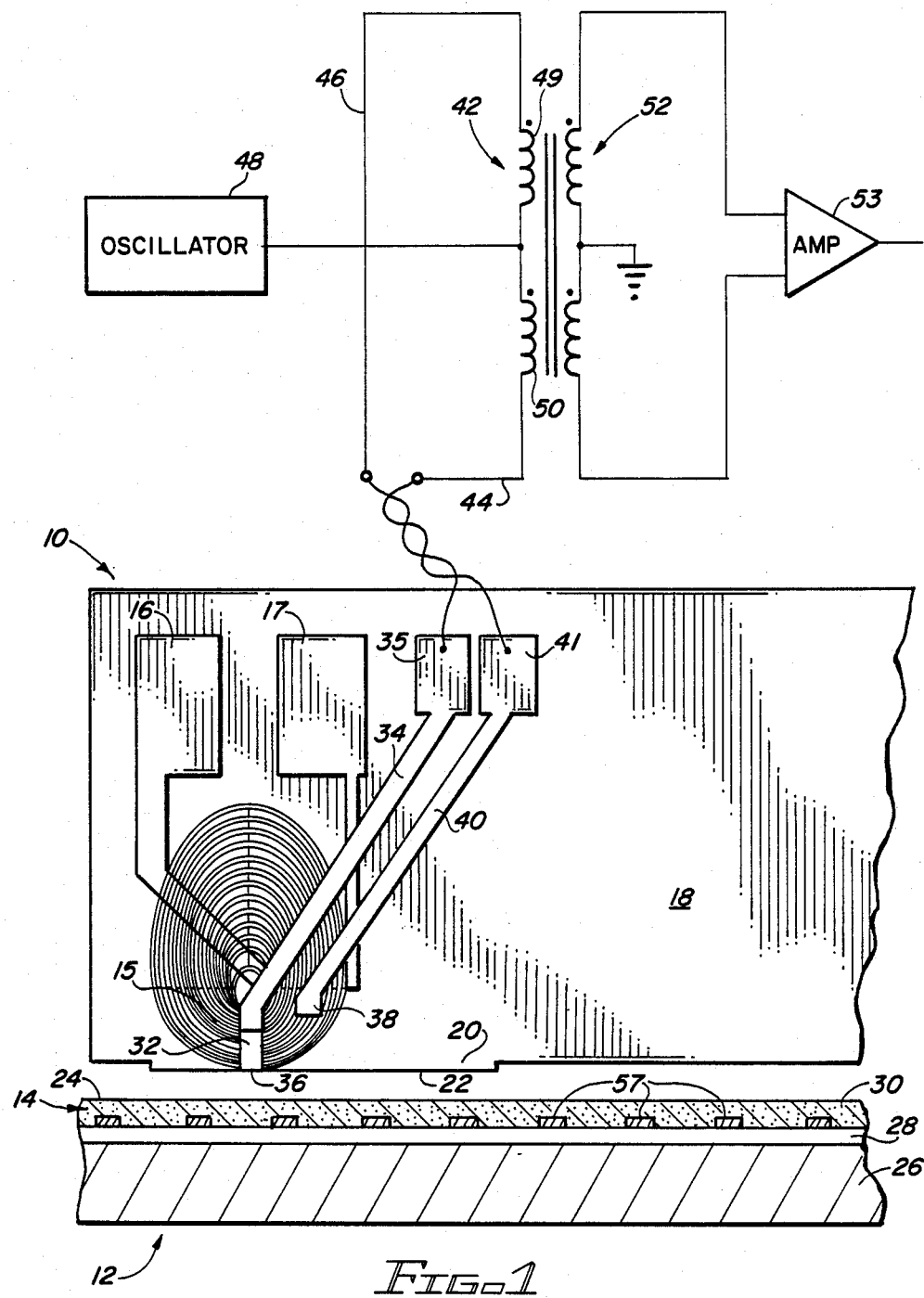
FIG. 1 is a schematic of the sensor circuit in combination with a view of the slider back side and a sectional view of a disk having a capacitive contrast pattern.

The capacitive sensor is illustrated in FIG. 1 as part of a schematic which includes a portion of an air bearing slider 10 and a sectional view of a magnetic recording disk 12 having a capacitive contrast pattern 14.

Slider 10 is a conventional slider which has a thin film inductive read/write head 15 formed on its back side or trailing surface 18. The head 15 includes a coil which is coupled to terminal pads 16, 17 for electrical connection to external read/write circuitry of the disk file. One of the slider rails 20 is depicted in FIG. 1 and has an air bearing surface 22 which faces the disk surface 24 of magnetic recording disk 12.

The disk 12 comprises a substrate 26, such as a conventional aluminum-magnesium alloy, a polymer dielectric layer 28 formed on the substrate 26, a patterned aluminum film 14 formed on the dielectric layer 28, and a conventional particulate magnetic coating 30 formed over the patterned film 14 and dielectric layer 28. Because the portion of disk 12 shown in FIG. 1 is a sectional view, the discrete elements of film 14 depicted in FIG. 1 are sectional views of aluminum slanted stripes 57 (See FIG. 2).

The capacitive contrast pattern of film 14 is sensed by sensing probe 32 formed on the back side 18 of slider 10. Sensing probe 32 is electrically coupled by conductive lead 34, which extends across the back side 18, to terminal pad 35 near the top of slider 10. Sensing probe 32 is formed to a predetermined thickness on slider back side 18 so as to provide a generally rectangularly shaped end 36 which faces the surface 24 of disk 12.

A dummy probe 38 and its electrical lead 40 and terminal pad 41 are also formed on the back side 18 of slider 10. The end of dummy probe 38 is placed a substantial distance away from the air bearing surface 22 so that the pattern of film 14 does not provide any variable capacitive input to dummy probe 38.

In addition to the sensing probe 32 and dummy probe 38, and their respective leads 34, 40 and terminal pads 35, 41, the sensing circuit includes an inductor 42 which has one end connected by lead 44 to terminal pad 31 and its opposite end connected by electrical lead 46 to terminal pad 35, and a high frequency oscillator 48 which provides an input to the center of inductor 42. As shown in FIG. 1, inductor 42 may comprise two separate coil sections 49, 50. Inductor 42 serves as the primary winding of a transformer having a secondary winding 52 which serves as the sensing coil. Any signal in the sensing circuit which is not cancelled by coil sections 49, 50 will be inductively coupled into sensing coil 52. The output of sensing coil 52 is amplified by amplifier 53 and subsequently demodulated for determining the position of sensing probe 32 relative to the capacitive contrast pattern 14. The details of the demodulation circuitry do not form a part of the present invention.

The total surface area of sensing probe 32, lead 34 and terminal pad 35 on slider back side 18 is made to be substantially the same as the total surface area of dummy probe 38, lead 40 and terminal pad 41. As shown in FIG. 1, this is accomplished by making the surface area of pad 41 slightly larger than pad 35 to compensate for the increased length of probe 32. In this manner the capacitance between the slider substrate and the conductive material formed by the respective probes and their electrical leads and termination pads is essentially equal. Thus, in the absence of alignment of conductive material in pattern 14 with the end 36 of sensing probe 32, the signals provided to opposite ends of inductor 42 will cancel, so that no signal will be sensed by sensing coil 52. In addition, both the sensing probe 32, dummy probe 38 and their respective leads 34, 40 are located in very close proximity to one another and directly over the electrical coil forming the thin film inductive read/write head 15. The sensing probe end 36 is precisely aligned in a radial direction with the gap of inductive head 15. Any electrical noise generated by inductive head 15 will be received equally by the sensing probe and the dummy probe and their respective leads and terminal pads, thereby resulting in a cancellation of noise to inductor 42.

In the preferred embodiment, leads 44, 46 have first portions which form a twisted wire pair extending from terminal pads 41, 35 across the suspension and to the ends of a flat polyimide cable bonded to the rigid support arm, and second portions which are patterned conductive leads deposited on the polyimide cable. The electrical leads for connecting the inductive head to the external read/write circuitry are also formed on the same flat flexible polyimide cable. Preferably, those portions of leads 44, 46 on the polyimide cable are spaced on opposite sides of the inductive head leads so that any noise from the inductive head leads is transmitted equally into opposite ends of inductor 42.

The sensing probe 32, dummy probe 38, and their respective leads and terminal pads are formed on slider back side 18 by conventional thin film techniques. An insulating film of $Al_2O_3$ is formed over the inductive head 15 before the conductive probes, leads and terminal pads are formed. Then a photoresist is spun onto the $Al_2O_3$ film and cured. The photoresist is exposed through a mask and developed to form the pattern of probes 32, 38, leads 34, 40 and terminal pads 35, 41. A film of nickel-iron (NiFe) is then electroplated to a first thickness equal to the desired thickness of the leads and terminal pads and the photoresist is removed. A second photoresist is then spun over the entire back side 18, including the NiFe film. This second photoresist is exposed through a mask and developed to form a pattern for just the sensing probe 32. Additional NiFe is then electroplated to give the sensing probe 32 its desired thickness, after which the second photoresist is removed. As indicated previously, sensing probe 36 is deposited to a thickness substantially greater than the thickness of lead 34. Thus, end portion 36 has a rectangular cross section which is sized to match the width of slanted stripes 57 (See FIG. 2). In the embodiment shown in FIG. 2, the diagonal length of the cross section of each portion 36 is approximately equal to the width of the slanted stripes 57 in order to provide the optimum signal.

Figure 2:
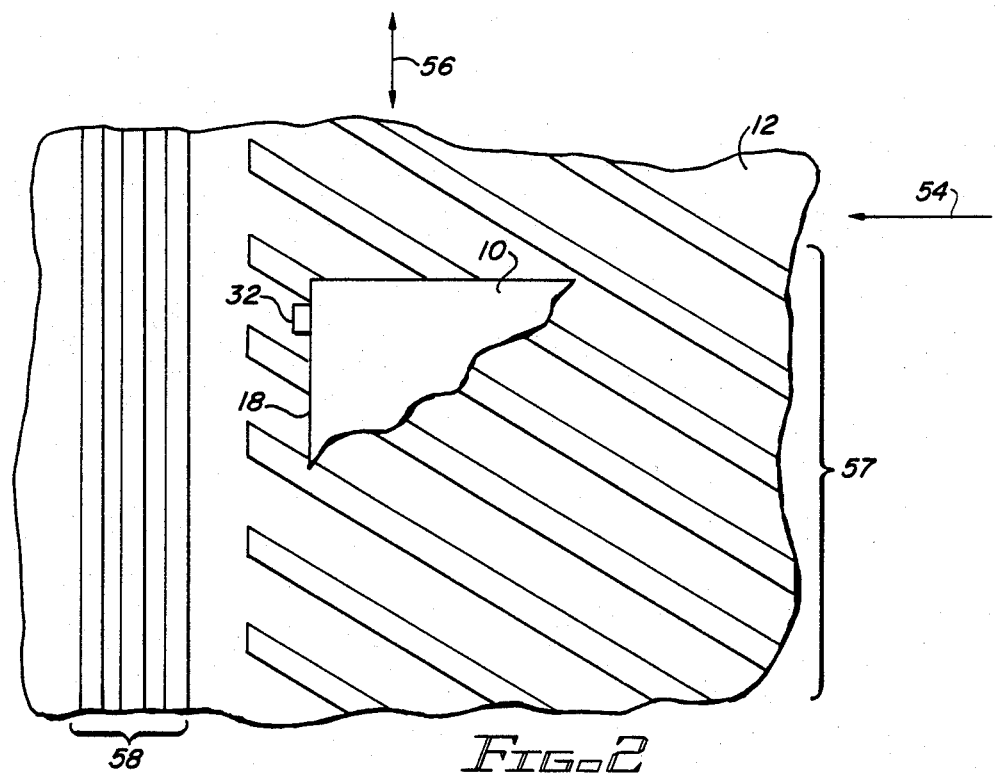
FIG. 2 is a view of a portion of a slider on a portion of a disk having a capacitive contrast pattern which includes slanted conductive stripes.

Referring now to FIG. 2, the portion of slider 10 having the sensing probe 32 formed on its back side 18 is illustrated with respect to a portion of a disk having a capacitive contrast pattern 14 which includes aluminum slanted stripes 57 and radial aluminum reference stripes 58. The direction of rotation of disk 12 relative to slider 10 is indicated by arrow 54, and the radial movement of slider 10 relative to the disk surface is indicated by arrow 56. As the disk moves in the direction indicated by arrow 54, sensing probe 32 is first exposed to the sequence of conductive material formed in radial reference stripes 58. As each conductive stripe passes under sensing probe 32 the capacitance sensed by end 36 of probe 32 is increased because the conductive stripes are closer to probe end 36 than is the substrate 26. At the same time the dummy probe 38 senses no change in capacitance because it is located a sufficient distance from air bearing surface 22. Because the signals input into opposite ends of inductor 42 when a conductive stripe is aligned with sensing probe 32 are not equal, a signal is sensed in the inductively coupled sensing coil 52. The demodulated output of the reference stripes 58 passing under sensing probe 32 provides a reference signal for the subsequent signal provided by the series of slanted stripes 57. The oscillator 48 preferably provides a 160 MHz signal to the center of inductor 42, and the pattern of stripes 58 and 57, together with the disk rotational speed, generate a signal at approximately 600 kHz. In a disk file with multiple head/arm assemblies and thus multiple capacitive servo sensors, each sensor may be connected to an oscillator of a unique frequency, with the frequencies separated by approximately 20 MHz to prevent signal interference. As shown in FIG. 2, the radial position of probe 32 between two adjacent slanted stripes 57 determines the phase of the signal relative to the reference signal. This phase determination is demodulated to provide a signal indicative of the radial position of probe 36 relative to adjacent slanted stripes.

Figure 3:
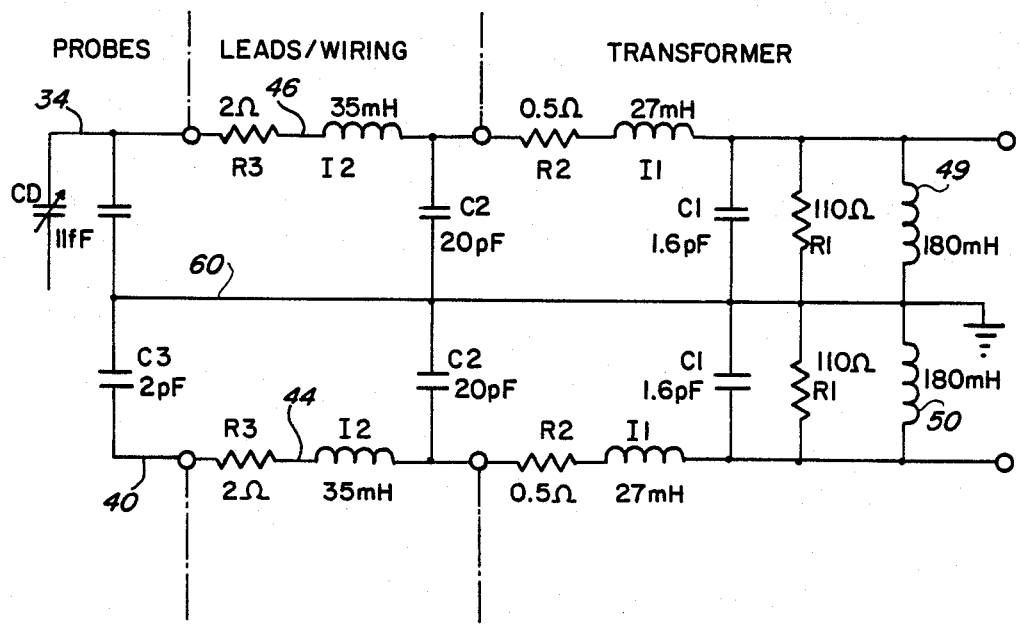
FIG. 3 is a diagram of an equivalent circuit for the sensor circuit.

A lumped element equivalent circuit for the sensor depicted in FIG. 1 is shown in FIG. 3, wherein representative values of resistance, capacitance and inductance are shown for the lumped elements. The elements are shown as tied to a common ground line 60. For purposes of the equivalent circuit, the ground is the center between inductor coil sections 49, 50. In the actual circuit depicted in FIG. 2, this location is the input for the signal from oscillator 48. With respect to the transformer portion of the sensor, resistances R1 represent losses in the transformer core, capacitances C1 represent the capacitances of inductors 49, 50, resistances R2 represent the resistances of coils 49, 50, and inductors I1 represent the leakage inductances of coils 49, 50. The resistances and inductances of leads 44, 46 are represented by resistances R3 and inductances I2. Capacitances C2 represent the shunt capacitance of leads 44, 46, such as the capacitance between the lead portions formed on the polyimide cable and the cable substrate. Capacitances C3 represent the capacitances between the conductive material on the slider back side 18 (i.e. probes 32, 38, leads 34, 40 and terminal pads 35, 41) and the slider. Capacitance CD is the variable capacitance between the sensing probe 32 and the disk substrate 12, the variable capacitance being due to the capacitive contrast pattern 14.

While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A sensor for detecting data head position information in a data recording disk file having at least one rotatable disk with a capacitive contrast pattern formed thereon and an actuator for positioning the head generally radially relative to data tracks on the disk, the sensor comprising:
   an air bearing slider supporting a data head and connected to the actuator;
   a sensing probe of conductive material attached to the slider and having an end in close proximity to and facing a disk surface;
   a dummy probe of conductive material attached to the slider and having an end spaced from the disk surface a distance substantially greater than the spacing between said sensing probe end and the disk surface;
   an inductor having one end electrically connected to the sensing probe and the other end connected to the dummy probe; and
   means electrically coupled to the center of the inductor for generating an oscillating electrical signal, wherein the inductor generates a signal in response to the capacitive contrast pattern on the disk sensed by the sensing probe.

2. The sensor according to claim 1 wherein the slider has a trailing surface and wherein the sensing probe and the dummy probe are attached to the trailing surface, said sensing probe end being oriented generally coplanar with the air bearing surface of the slider.

3. The sensor according to claim 2 wherein said sensing probe end is sized to match the capacitive contrast pattern on the disk.

4. The sensor according to claim 1 wherein the slider has a trailing surface, wherein the data head is a thin film read/write head formed on the trailing surface and wherein the sensing probe and the dummy probe are located on said trailing surface substantially close to one another, wherein any noise from said thin film read/write head is received by both the sensing probe and the dummy probe.

5. The sensor according to claim 4 wherein the sensing probe is formed over and is in radial alignment with a gap of the thin film read/write head.

6. The sensor according to claim 1 wherein the slider has a trailing surface, wherein the sensing probe and dummy probe are formed on the trailing surface, and further comprising a first lead and terminal pad formed on the trailing surface and electrically coupled to the sensing probe, and a second lead and terminal pad electrically coupled to the dummy probe and formed on the trailing surface, the surface areas of the sensing probe and connected lead and terminal pad being generally equal to the surface area of the dummy probe and connected lead and terminal pad.

7. The sensor according to claim 1 further comprising a sensing coil located adjacent to and inductively coupled to the inductor for sensing the signal generated by the inductor.

8. The sensor according to claim 1 wherein the inductor comprises two electrically connected coil sections.

* * * * *